United States Patent [19]

Scholl

[11] Patent Number: 5,780,531

[45] Date of Patent: Jul. 14, 1998

[54] SURFACE-MODIFIED, OXIDIC OR SILICEOUS FILLERS AND THEIR USE

[75] Inventor: Thomas Scholl, Bergisch Gladbach, Germany

[73] Assignee: Bayer AG, Leverkusen, Germany

[21] Appl. No.: 665,313

[22] Filed: Jun. 17, 1996

[30] Foreign Application Priority Data

Jun. 28, 1995 [DE] Germany .......................... 195 23 470.7
Dec. 28, 1995 [DE] Germany .......................... 195 49 034.7

[51] Int. Cl.$^6$ .............................. C08K 9/06; C08G 77/04
[52] U.S. Cl. .................... 523/213; 523/212; 524/265; 524/860; 524/863; 528/25; 528/30; 525/332.6; 525/333.5; 525/333.9; 525/341; 525/342; 525/343
[58] Field of Search ...................... 523/213, 212; 524/265, 860, 863; 525/332.6, 333.5, 333.9, 341, 342, 343, 535; 528/25, 30

[56] References Cited

U.S. PATENT DOCUMENTS

| | | | |
|---|---|---|---|
| 3,873,489 | 3/1975 | Thurn et al. ............................. | 523/213 |
| 4,704,414 | 11/1987 | Kerner et al. ............................. | 523/213 |
| 4,709,065 | 11/1987 | Yoshioke et al. ......................... | 556/428 |
| 5,116,886 | 5/1992 | Wolff et al. ............................. | 523/213 |

*Primary Examiner*—Vasu Jagannathan
*Assistant Examiner*—Olga Asinovsky
*Attorney, Agent, or Firm*—Connolly & Hutz

[57] ABSTRACT

The surface-modified fillers according to the invention are manufactured by treating oxidic or siliceous fillers with a silane of the formula

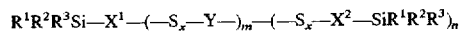

$$R^1R^2R^3Si-X^1-(-S_x-Y-)_m-(-S_x-X^2-SiR^1R^2R^3)_n$$

and are used for the manufacture of rubber vulcanizates, particularly tyres, with reduced dynamic damping and favourable abrasion behaviour.

16 Claims, No Drawings

SURFACE-MODIFIED, OXIDIC OR SILICEOUS FILLERS AND THEIR USE

The present invention relates to new surface-modified, oxidic or siliceous fillers and their use for the manufacture of rubber compounds and vulcanizates. The rubber compounds obtained with these modified fillers are suitable for the manufacture of highly reinforced, abrasion-resistant moulded bodies, particularly for the manufacture of tyres that have a low resistance to rolling and a high resistance to abrasion.

The treatment of filler surfaces with organosilicon compounds for the improvement of the filler/matrix coupling in thermoplastic and duroplastic composites as well as filled rubber systems is known. Particularly suitable for the manufacture of highly reinforced and abrasion-resistant rubber articles is the treatment, described in U.S. Pat. Nos. 4,514,231 and 4,704,414, of fillers with compounds of the structure: $(R_n^1(RO)_{3-n}Si—(Alk)_m—Ar)_p)_2(S)_x$, especially bis (triethoxysilylpropyl) tetrasulphide. Under the treatment conditions quoted there the organosilicon compound reacts with the hydroxyl groups of the filler surface.

The fillers of U.S. Pat. Nos. 4,514,231 and 4,704,414 are certainly already considerably more active than the unmodified ones, but it was the aim of the present invention to increase the reinforcing effect of the oxidic and siliceous fillers still further, in order on the one hand to improve the technical properties of the rubber articles and on the other to reduce the raw material costs for the manufacture of like grades. Owing to their low damping effect and the high abrasion resistance, the novel surface-modified oxidic or siliceous fillers are especially suitable for the manufacture of motor vehicle tyres with low resistance to rolling and high mileage.

The present invention therefore provides surface-treated oxidic or siliceous fillers obtainable by reaction of an oxidic or siliceous filler with a silane of formula (I)

$$R^1R^2R^3Si—X^1—(—S_x—Y—)_m—(—S_x—X^2—SiR^1R^2R^3)_n \quad (I),$$

wherein $R^1$, $R^2$ and $R^3$ are the same or different and represent $C_1–C_{18}$ alkyl or $C_1–C_{18}$ alkoxy, which can optionally be interrupted by oxygen, nitrogen or sulphur atoms, $C_6–C_{12}$ aryl or aryloxy or $C_7–C_{18}$ alkylaryl or alkylaryloxy, provided that at least one of the groups $R^1$ to $R^3$ is an alkoxy, aryloxy or alkylaryloxy group;

$X^1$ and $X^2$ are the same or different and stand for linear, branched or cyclic, optionally unsaturated, $C_1–C_{12}$ alkylene groups, Y stands for linear, branched or cyclic, optionally unsaturated $C_1–C_{18}$ alkylene groups, that are optionally substituted with $C_6–C_{12}$ aryl, $C_1–C_8$ alkoxy or hydroxy groups and may optionally be interrupted by oxygen, sulphur or nitrogen atoms or aromatic $C_{6-12}$ groups, as well as for $C_{6-12}$ arylene groups or heteroarylene groups, m stands for a whole number from 1 to 20, n stands for a whole number from 1 to 6 and x represents a number from 1 to 8, at temperatures of 50° to 220° C., optionally in vacuum, wherein 0.1 to 25 wt. %, relative to oxidic or siliceous filler, of silanes of formula (I) are used.

Particularly preferred silanes according to the invention are e.g. those of formula (I) wherein $X^1$ and $X^2$ represent methylene, propylene, butylene, pentylene or hexylene groups and Y represents methylene, ethylene, propylene, butylene, hexylene, cyclohexylene, octylene, decylene, dodecylene, 2,2'-oxydiethylene, methylenebis(2,2'-oxyethylene), ethylenebis(2,2'-oxyethylene), 1,1'-thiodiethylene, N-methyl-N',N"-diethylene or α,α-p-xylidene groups or higher-valent groups such as 1,2,3-propylidene, N,N',N"-triethylene or 1,3,5-s-triazinyl, and in which n represents whole numbers from 1 to 6, x numbers from 2 to 6 and m whole numbers from 1 to 10. The silanes according to the invention can exist both as a single compound with a defined molecular weight and as an oligomer mixture with a molecular weight distribution. For reasons of process technology it is in many cases simpler to manufacture and use an oligomeric or polymeric mixture. The compounds have a molecular weight between about 500 and 8000.

The silanes (I) according to the invention can be manufactured in various ways:

A: By reaction of mercapto-group-containing silanes and di- and/or polymeric mercaptans with sulphur dichloride or disulphur dichloride with splitting off of HCl. The reaction can be carried out in a manner known as such at temperatures of –30° to +80° C., optionally in solvents such as alcohols or aromatic hydrocarbons:

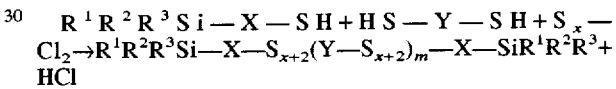

(For the carrying-out of the reaction see e.g. Houben Weyl, Methoden der organischen Chemie, volume 9, pages 88 ff. (1955) and volume E 11 (1985), Thieme Verlag, Stuttgart).

B: The preparation of compounds (I) is possible particularly favourably if haloalkyl silyl ethers and polyhalides are reacted with metal polysulphides in the presence of alcoholic solvents at temperatures of –20° to +120° C.:

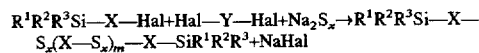

Preferably used as metal polysulphides are those of the formula $Me_2S_x$, in which Me stands for lithium, sodium or potassium and x represents a number between 2 and 6.

Alcohols preferably are used as solvents, such as methanol, ethanol, n-propanol, i-propanol, i-butanol, amyl alcohol, hexyl alcohol, n-octanol, i-octanol, ethylene glycol, 1,2- and 1,3-propylene glycol, 1,4-butanediol, 1,6-hexanediol as well as mixtures of these alcohols with aromatic, aliphatic or cycloaliphatic hydrocarbons, such as toluene, cyclohexane, hexane, octane, or open-chain or cyclic ethers such as diethyl ether, dibutyl ether, tetrahydrofuran, 1,3-dioxolane and their mixtures with alcohols.

Particularly preferred silanes correspond to the formulae

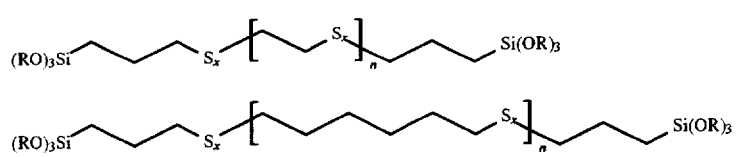

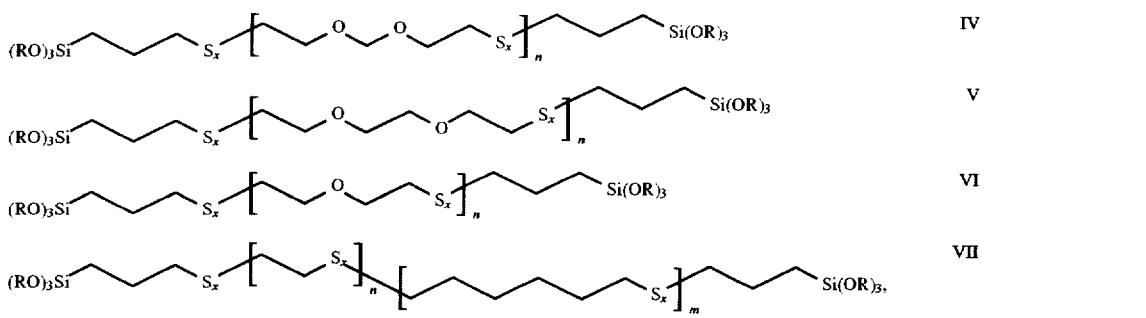

wherein
R=CH$_3$, C$_2$H$_5$,
x=1–8,
n=1–10,
m=1–10 as well as

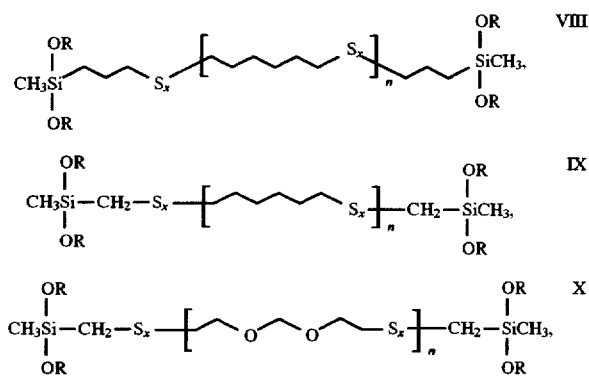

wherein
R=CH$_3$, C$_2$H$_5$,
x=1–8,
n=1–10.

Oxidic and siliceous fillers means all known natural or synthetic inorganic fillers which, because of a content of hydroxyl groups and/or water of hydration, can react superficially with the silanes (I). These are for example precipitated or pyrogenic silica, aluminium hydroxide, aluminium silicate, calcium silicate, calcium sulphate, china clay and/or calcined clay.

Particularly preferred are:

Highly-dispersed silicas, manufactured e.g. by precipitation of solutions of silicates or flame hydrolysis of silicon halides, with specific surface areas of 5 to 1000, preferably 20 to 400, m$^2$/g (BET surface area) and with primary particle sizes of 10 to 400 nm. The silicas can also optionally be present as mixed oxides with other metal oxides, such as Al, Mg, Ca, Ba, Zn and Ti oxides.

Synthetic silicates, such as aluminium silicate, alkaline earth metal silicates such as magnesium silicate or calcium silicate, with BET surface areas of 20 to 400 m$^2$/g and primary particle diameters of 10 to 400 nm.

Natural silicates, such as kaolin and other naturally occurring silicas.

Glass fibres and glass fibre products (mats, rovings) or glass microspheres.

The treatment of the fillers with the oligomeric silanes of formula (I) can be carried out in bulk, in organic solvents or in aqueous dispersion, under normal pressure or in vacuum, at temperatures from 50° to 220° C., preferably at 50° to 130° C. During this treatment additional compounds can also optionally be present which interact chemically or physically with the surface of the filler, such as for example sulphur-free alkylsilyl ethers, hydroxy-group-containing polysiloxanes, alkyl polyglycol ethers and stearic acid. The alcohol arising during the reaction is preferably removed from the reaction product, but it can also remain in the product without loss of efficiency, since the reaction concerned is irreversible. The alcohol is advantageously removed at once during the reaction, optionally together with water, or in a drying step connected at the outlet side.

Suitable solvents for carrying out the surface modification are for example aliphatic or aromatic hydrocarbons, chlorinated aliphatic or chlorinated aromatic hydrocarbons, alcohols, ethers or carboxylic acid amides. Particularly suitable are methanol, ethanol, n-propanol, i-propanol, i-butanol, amyl alcohol, hexyl alcohol, n-octanol, i-octanol, ethylene glycol, 1,2- and 1,3-propylene glycol, 1,4-butanediol, 1,6-hexanediol as well as mixtures of these alcohols with aromatic, aliphatic or cycloaliphatic hydrocarbons, such as toluene, cyclohexane, hexane, octane, or open-chain or cyclic ethers such as diethyl ether, dibutyl ether, tetrahydrofuran, 1,3-dioxolane and their mixtures with alcohols or amides, such as dimethylformamide and dimethylacetamide.

In a preferred variant the compounds (I) are added as an aqueous dispersion to the pure filler or to an aqueous suspension of the filler, and the alcohol and the water are thereafter removed by heating to about 50° to 220° C., optionally by application of vacuum. In another process variant the compounds (I), optionally as a dispersion, are added to a suspension of the filler, heated to 50° to 100° C., filtered and dried thereafter at 50° to 220° C., optionally in vacuum. Spray drying likewise is suitable.

The dispersions of the silanes of formula (I) can be prepared e.g. with the aid of known dispersing apparatuses, such as ultraturrax, shear-blade and shear-slit dissolvers, optionally in the presence of surfactants, at temperatures of room temperature (ca. 20° C.) to 100° C. Surfactants that may be mentioned are: polyethers, as for example polyethylene oxide with an average molecular weight of 1000 to 4000, alkylphenolpolyglycol ethers, as for example the adduct of 10 mol ethylene oxide per mol nonylphenol, alkyl polyglycol ethers, such as for example the adduct of 7 mol of ethylene oxide and 1-dodecanol, sulphonated alkylaromatics, as for example dodecylbenzenesulphonic acid sodium salt, sulphonated aliphatics, as for example dioctyl sulphosuccinate, sulphates, as for example lauryl sulphate, ammonium salts, as for example cetyltrimethylammonium chloride.

Preferred solid contents of silanes (I) in the dispersion are 0.1 to 85 wt. %, most preferably 5 to 50 wt. %, relative to the total weight of the dispersion. Preferred contents of emulsifier are 0.1 to 50 wt. %, most preferably 1 to 15 wt. %, in each case relative to the total weight of the dispersion.

In a further preferred variant the surface treatment of the oxidic or siliceous fillers is carried out in the presence of rubber solutions or rubber latices, optionally also in the presence of other, chemically non-reacting, fillers, particularly carbon blacks, with formation of so-called rubber/filler masterbatches. In this case a solution or aqueous dispersion of the silane (I) is reacted in the presence of a rubber solution or a rubber latex, optionally in the presence of other non-reacting fillers, with an oxidic filler, optionally in aqueous suspension, and thereafter isolated by evaporation, spray drying or filtration and drying. The content of fillers can in this case be varied within wide limits, especially up to contents of 150 parts by wt. of surface-treated filler in 100 parts by wt. rubber, preferably 30 to 100 pts wt. filler per 100 parts by wt. rubber.

In addition to natural rubber, synthetic rubbers also are suitable as rubbers for the manufacture of such filler/rubber masterbatches. Preferred synthetic rubbers are described for example in W. Hofmann, Rubber Technology, Gentner Verlag, Stuttgart 1980. They include among others BR—Polybutadiene
ABR—Butadiene/acrylic acid-$C_{1-4}$ alkyl ester copolymers
CR—Polychloroprene
IR—Polyisoprene
SBR—Styrene/butadiene copolymers with styrene contents of 1 to 60, preferably 20 to 50, wt. %
XSBR—Styrene/butadiene copolymers and graft polymers with other unsaturated, polar monomers, such as for example acrylic acid, methacrylic acid, acrylonitrile, hydroxyethyl acrylate and methacrylate with contents of copolymerised polar monomers of 1–30% by weight
IIR—Isobutylene/isoprene copolymers
NBR—Butadiene/acrylonitrile copolymers with acrylonitrile contents of 5 to 60, preferably 10 to 50, wt. %
HNBR—Partially or fully hydrogenated NBR rubber
EPDM—Ethylene/propylene/diene copolymers Rubber vulcanizates can be manufactured from the surface-treated fillers according to the invention, the rubbers and optionally known additional rubber auxiliary agents by the methods and techniques known in practice; for example by mixing filler, rubber and optionally other auxiliary agents in an internal mixer at temperatures of 100° to 180° C. and thereafter admixing the cross-linking system (vulcanizing agents) at 50° to 120° C. In doing so, apart from the surface-treated fillers according to the invention other active or inactive fillers can be used in addition. Most preferably, carbon blacks or superficially unmodified silica are added as other fillers. The carbon blacks to be used in this case are manufactured according to the flame soot, furnace or channel black processes and have BET surface areas of 20 to 300 m²/g, as for example SAF, ISAF, IISAF, HAF, FEF or GPF blacks.

Particularly preferred rubber compounds contain 10–150 parts by weight of light-coloured fillers, optionally together with 0 to 100 parts by weight of carbon black, each relative to 100 parts by weight of rubber, as well as optionally other rubber auxiliary agents in amounts of 0.1 to 50 wt. %.

In addition to natural rubber, synthetic rubbers also are suitable for the manufacture of rubber vulcanizates with the aid of the surface-modified fillers. Preferred synthetic rubbers are described for example in W. Hofmann, Rubber Technology, Gentner Verlag, Stuttgart 1980. They include among others BR—Polybutadiene
ABR—Butadiene/acrylic acid-$C_{1-4}$ alkyl ester copolymers
CR—Polychloroprene
IR—Polyisoprene
SBR—Styrene/butadiene copolymers with styrene contents of 1 to 60, preferably 2 to 50, wt. %
XSBR—Styrene/butadiene copolymers and graft polymers with other unsaturated, polar monomers, such as for example acrylic acid, methacrylic acid, acrylonitrile, hydroxyethyl acrylate and methacrylate with contents of copolymerised polar monomers of 1–30% by weight
IIR—Isobutylene/isoprene copolymers
NBR—Butadiene/acrylonitrile copolymers with acrylonitrile contents of 5 to 60, preferably 10 to 50, wt. %
HNBR—Partially or fully hydrogenated NBR rubber
EPDM—Ethylene/propylene/diene copolymers as well as blends of these rubbers. Especially of interest for the manufacture of motor vehicle tyres with the aid of the surface-modified fillers are anionically polymerized L-SBR rubbers with a glass transition temperature above −50° C., which can optionally be modified with silyl ethers or other functional groups, as described e.g. in EP-A 447 066, as well as their blends with diene rubbers.

As mentioned, the rubber vulcanizates according to the invention can contain other rubber auxiliary agents, such as reaction accelerators, antiaging agents, heat stabilizers, light-stability agents, ozone-stability agents, processing aids, plasticizers, tackifiers, blowing agents, dyes, pigments, waxes, extenders, organic acids, inhibitors, metal oxides as well as activators such as triethanolamine, polyethylene glycol, hexanetriol and bis(triethoxysilylpropyl) tetrasulphide, surfactants and emulsifiers, such as the adduct of 5–10 mol of ethylene oxide and dodecanol, sulphur-free silanes, such as octadecyl-triethoxysilane and hydroxy-group-containing polydimethylsiloxanes, which are known in the rubber industry.

The rubber auxiliary agents are used in conventional amounts, which are governed among other things by the intended application. Conventional amounts are e.g. amounts of 0.1 to 50 wt. % relative to the rubber used.

Sulphur, sulphur donors or peroxides, as known cross-linking agents (vulcanizing agents), can be used. The rubber compounds according to the invention can, over and above that, include vulcanization accelerators. Examples of suitable vulcanization accelerators are mercaptobenzothiazoles and -sulphenamides, guanidines, thiurams, dithiocarbamates, thioureas and thiocarbonates. The cross-linking accelerators and cross-linking agents, such as sulphur or peroxides, are used in each case in amounts of 0.1 to 10 wt. %, preferably 0.1 to 5 wt. %, relative to the rubber used.

The vulcanization can be carried out at temperatures of 100° to 200° C., preferably 130° to 180° C., optionally under a pressure of 10 to 200 bar.

The mixing of the rubbers with the surface-modified fillers may be carried out in conventional mixing units, such as cylinders, internal mixers and compounding extruders.

The rubber vulcanizates according to the invention are suitable for the manufacture of moulded bodies, e.g. for the manufacture of cable jackets, hoses, transmission belts, conveyor belts, roller coatings, tyres, shoe soles, gaskets and damping elements.

EXAMPLES

Preparation of Silanes of Formula (I)

Example 1

$(EtO)_3Si-CH_2CH_2CH_2-(S_4-CH_2CH_2-O-CH_2-O-CH_2CH_2)_n-S_4-CH_2CH_2CH_2-Si(OEt)_3$ with $\bar{n}=2$ 117 g (1.5 mol) anhydrous $Na_2S$ were heated to reflux for 1 h with 144 g (4.5 mol) sulphur in a solvent mixture of 400 ml ethanol and 400 ml toluene. There were then added first 240.4 g (1 mol) 3-chloropropyltriethoxysilane and after one hour's heating at reflux 173.0 g (1 mol) bis(2-chloroethyl) formal. After 10 hours' further stirring the mixture was filtered and the solution evaporated in vacuum. 475 g of a brown oil with a viscosity of 200 mPa.s (25° C.) were obtained.

Elementary Analysis

|       | C    | H   | S    | Si  |   |
|-------|------|-----|------|-----|---|
| calc. | 33.7 | 6.2 | 38.5 | 5.8 | % |
| found | 33.4 | 6.3 | 39.0 | 5.3 | % |

Example 2

$EtO)_3Si-CH_2CH_2CH_2-(S_4-CH_2CH_2-O-CH_2-O-CH_2CH_2)_n-S_4-CH_2CH_2CH_2-Si(OEt)_3$ with $\bar{n}=3$ The procedure of Example 1 was followed. In doing so, 117 g (1.5 mol) anhydrous sodium sulphide were reacted with 144 g (4.5 mol) sulphur, 183.9 g (0.765 mol) 3-chloropropyltriethoxysilane and 197.5 g (1.142 mol) bis (2-chloroethyl)formal.

453 g of a brown oil with viscosity 500 mPa.s (25° C.) were obtained.

Elementary Analysis

|       | C    | H   | S    | Si  |   |
|-------|------|-----|------|-----|---|
| calc. | 32.2 | 5.9 | 41.7 | 4.6 | % |
| found | 32.4 | 5.9 | 41.2 | 4.4 | % |

Example 3

$EtO)_3Si-CH_2CH_2CH_2-(S_4-CH_2CH_2-O-CH_2-O-CH_2CH_2)_n-S_4-CH_2CH_2CH_2-Si(OEt)_3$ with $\bar{n}=4$ The procedure of Example 1 was followed. In doing so, 97.5 g (1.25 mol) anhydrous sodium sulphide were reacted with 120 g (3.75 mol) sulphur, 120 g (0.5 mol) 3-chloropropyltriethoxysilane and 173 g (1 mol) bis(2-chloroethyl)formal. 351 g of a brown oil with viscosity 880 mPa.s (25° C.) were obtained.

Elementary Analysis

|       | C    | H   | S    | Si  |   |
|-------|------|-----|------|-----|---|
| calc. | 31.3 | 5.6 | 43.9 | 3.8 | % |
| found | 31.3 | 5.6 | 41.6 | 4.0 | % |

Example 4

$EtO)_3Si-CH_2CH_2CH_2-(S_4-CH_2CH_2-O-CH_2CH_2-O-CH_2CH_2)_n-S_4-CH_2CH_2CH_2-Si(OEt)_3$ with $\bar{n}=2$ The procedure of Example 1 was followed. In doing so, 58.5 g (0.75 mol) anhydrous sodium sulphide were reacted in 500 ml ethanol with 72 g (2.25 mol) sulphur, 120.2 g (0.5 mol) 3-chloropropyltriethoxysilane and 93.5 g (0.5 mol) 1,2-bis(chloroethoxy)ethane. 223 g of a brown oil were obtained.

Elementary Analysis

|       | C    | H   | S    | Si  |   |
|-------|------|-----|------|-----|---|
| calc. | 35.1 | 6.4 | 37.4 | 5.5 | % |
| found | 35.3 | 6.5 | 36.5 | 6.0 | % |

Example 5

$EtO)_3Si-CH_2CH_2CH_2-(S_4-CH_2CH_2-CH_2CH_2-CH_2CH_2)_nS_4-CH_2CH_2CH_2-Si(OEt)_3$ with $\bar{n}=3$ The procedure of Example 1 was followed. In doing so, 234 g (3 mol) anhydrous sodium sulphide were reacted in 1020 ml ethanol and 441 ml toluene with 288 g (9 mol) sulphur, 367.8 g (1.53 mol) 3-chloropropyltriethoxysilane and 355.9 g (2.295 mol) 1,6-dichlorohexane. 861 g of a brown oil were obtained.

Elementary Analysis

|       | C    | H   | S    | Si  |   |
|-------|------|-----|------|-----|---|
| calc. | 36.8 | 6.6 | 43.6 | 4.8 | % |
| found | 36.7 | 6.5 | 43.2 | 4.7 | % |

Preparation of the Surface-modified Oxidic or Siliceous Fillers According to the Invention

Example 6

40.6 g of the compound of Example 2 were dissolved in 200 ml toluene. This solution was added with stirring to a suspension of 500 g Vulkasil S (high-activity precipitated silica, BET surface area about 180 $m^2/g$, Bayer AG) in 4 1 toluene. Thereafter the solvent was distilled off at 110° to 130° C., finally in vacuum (20 mm Hg).

Example 7

40.6 g of the compound according to Example 5 were emulsified in 360 g water with an ultraturrax with 10 g of an adduct of 10 mol ethylene oxide on nonylphenol. This dispersion was added immediately afterwards to a suspension of 500 g Vulkasil S in 5 1 water and the mixture was heated with stirring for 1 hour at 90° C. The mixture was then filtered and the residue dried at 110° to 130° C., finally in vacuum (20 mm Hg).

Example 8 (Comparative Example)

The procedure of Example 7 was followed, the compound according to Example 5 being replaced, however, by the same amount of bis(triethoxysilylpropyl) tetrasulphide (according to U.S. Pat. Nos. 4,154,231 or 4,704,414).

Preparation of rubber vulcanizates with the fillers according to the invention:

| Composition | A | B | Comparative |
|---|---|---|---|
| The following rubber compounds were prepared in the internal mixer at 130° C. The amounts are quoted as parts by weight: | | | |
| S-SBR rubber Buna VSL 1954 S 25 (Bayer AG) | 75 | 75 | 75 |
| BR rubber Buna CB 11 (Bayer AG) | 25 | 25 | 25 |
| Silica according to Example 6 | 86.5 | 0 | 0 |
| Silica according to Example 7 | 0 | 86.5 | 0 |

-continued

Preparation of rubber vulcanizates
with the fillers according to the invention:

| Composition | A | B | Comparative |
|---|---|---|---|
| Silica according to Example 8 (Comparative) | 0 | 0 | 86.5 |
| Carbon black Corax N 339 | 6 | 6 | 6 |
| Aromatic oil Renopal 450 (Rheinchemie) | 32.5 | 32.5 | 32.5 |
| Zinc oxide | 2.5 | 2.5 | 2.5 |
| Stearic acid | 1 | 1 | 1 |
| Antioxidant Vulkanox 4020 (Bayer AG) | 1 | 1 | 1 |
| Ozone protection wax Antilux 654 (Rheinchemie) | 1.5 | 1.5 | 1.5 |
| Next, sulphur and accelerators were admixed on the roll at 50° C.: | | | |
| Sulphur | 1.5 | 1.5 | 1.5 |
| N-cyclohexylmercaptobenzothiazol-sulphenamide | 1.5 | 1.5 | 1.5 |
| Diphenylguanidine Vulkacit DPG (Bayer) | 2 | 2 | 2 |

Thereupon the rubber compounds were vulcanized for 40 minutes at 160° C.

| Properties of the vulcanisates: | A | B | Comparison |
|---|---|---|---|
| Modulus value at 300% elongation (MPa) | 14.6 | 13.6 | 12.2 |
| Tensile strength (MPa) | 17.6 | 18.3 | 18 |
| Elongation at break (%) | 356 | 392 | 410 |
| Hardness (Shore A) | 77 | 76 | 71 |
| Elasticity at 70° C. (%) | 45 | 47 | 44 |
| tan delta at 60° C. | 0.119 | 0.108 | 0.131 |

I claim:

1. Surface-treated oxidic or siliceous fillers for rubber compounds and vulcanizates obtained by reaction of an oxidic or siliceous filler with a silane of the formula (I)

$$R^1R^2R^3Si\text{—}X^1\text{—}(\text{—}S_x\text{—}Y\text{—})_m\text{—}(\text{—}S_x\text{—}X^2\text{—}SiR^1R^2R^3)_n \quad (I),$$

wherein

R$^1$, R$^2$ and R$^3$ are the same or different and represent C$_1$–C$_{18}$ alkyl, C$_1$–C$_{18}$ alkoxy, which can optionally be interrupted by oxygen, nitrogen or sulphur atoms, C$_6$–C$_{12}$ aryl or aryloxy or C$_7$–C$_{18}$ alkylaryl or alkylaryloxy, provided that at least one of the groups R$^1$ to R$^3$ is an alkoxy, aryloxy or alkylaryloxy group;

X$^1$ and X$^2$ are the same or different and stand for linear, branched or cyclic, optionally unsaturated C$_1$–C$_{12}$ alkylene groups, Y stands for linear, branched or cyclic, optionally unsaturated C$_1$–C$_{18}$ alkylene groups, which optionally are substituted with C$_6$–C$_{12}$ aryl, C$_1$–C$_8$ alkoxy or hydroxy groups and may optionally be interrupted by oxygen, sulphur or nitrogen atoms or aromatic C$_6$–C$_{12}$ groups, as well as for C$_6$–C$_{12}$ arylene groups or heteroarylene groups, m stands for a whole number from 2 to 20, n stands for a whole number from 1 to 6 and x represents a number from 1 to 8, at temperatures of 50° to 220° C., optionally in vacuum, wherein 0.1 to 25 wt. %, relative to oxidic or siliceous filler, of silanes of formula (I) are used.

2. A method of using the surface-modified fillers according to claim 1, wherein the fillers are mixed with a rubber or blend of rubbers.

3. Surface-treated oxidic or siliceous fillers according to claim 1, wherein:

X$^1$ and X$^2$ are the same or different and are selected from the group consisting of methylene, propylene, butylene, pentylene and hexylene groups, Y stands for methylene, ethylene, propylene, butylene, hexylene, cyclohexylene, octylene, decylene, dodecylene, 2,2'-oxydiethylene, methylenebis (2,2'-oxyethylene), ethylenebis (2,2'-oxyethylene), 1,1'-thiodiethylene, N-methyl-N', N"-diethylene, α,α-p-xylidene, 1,2,3-propylidene, N,N',N"-triethylene or 1,3,5-s-triazinyl groups, n stands for a whole number from 1 to 6, x stands for a number from 2 to 6 and m stands for a whole number from 2 to 10.

4. Surface-treated oxidic or siliceous fillers according to claim 1, wherein said oxidic or siliceous filler is selected from the group consisting of precipitated silica, pyrogenic silica, aluminum hydroxide, aluminum silicate, calcium silicate, calcium sulphate, china clay and calcined clay.

5. Surface-treated oxidic or siliceous fillers according to claim 1, wherein said oxidic or siliceous filler is a highly-dispersed silica with a specific surface area of 5 to 1,000 m$^2$/g.

6. Surface-treated oxidic or siliceous fillers according to claim 1, wherein said oxidic or siliceous filler is a highly-dispersed silica with a primary particle size of from 10 to 400 nm.

7. Surface-treated oxidic or siliceous fillers according to claim 1, wherein said oxidic or siliceous filler is a synthetic silicate with a BET surface area of from 20 to 400 m$^2$/g and a primary particle diameter of from 10 to 400 nm.

8. Surface-treated oxidic or siliceous fillers according to claim 1, wherein said oxidic or siliceous filler is a natural silicate.

9. Surface-treated oxidic or siliceous fillers according to claim 1, wherein said oxidic or siliceous filler is glass fibers or a glass fiber product or glass microspheres.

10. Surface-treated oxidic or siliceous fillers for rubber compounds or vulcanizates obtained by reaction of an oxidic or siliceous filler with a silane selected from the group consisting of:

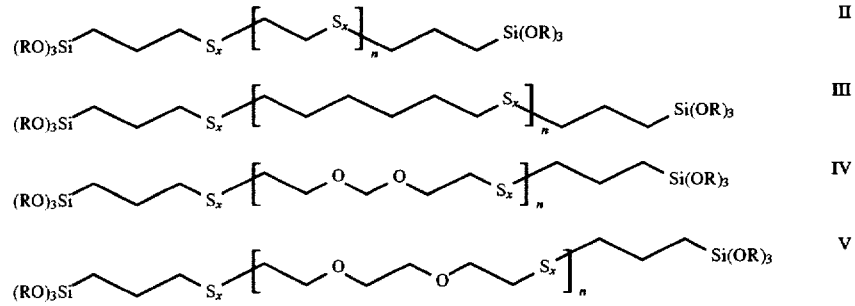

-continued

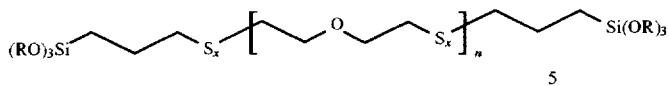
VI

R=CH$_3$, C$_2$H$_5$,
x=1-8, and
n=2-10, and

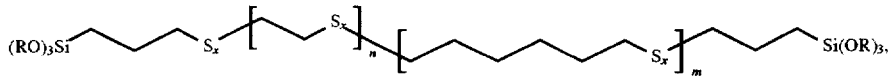
VII wherein, in formula VII,
R=CH$_3$, C$_2$H$_5$,
x=1-8,
n=1-10, and
m=1-10.

11. Surface-treated oxidic or siliceous fillers for rubber compounds and vulcanizates obtained by reaction of an oxidic or siliceous filler with a silane selected from the group consisting of:

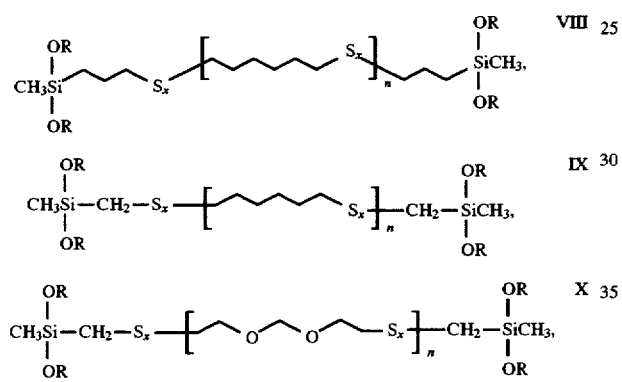

wherein
R=CH$_3$, C$_2$H$_5$,
x=1-8, and
n=2-10.

12. Surface-treated oxidic or siliceous fillers according to claim 1, wherein m is a whole number from 3 to 20.

13. Surface-treated oxidic or siliceous fillers according to claim 1, wherein m is a whole number from 4 to 20.

14. Surface-treated oxidic or siliceous fillers according to claim 10, wherein in formula VII n=2-10.

15. Surface-treated oxidic or siliceous fillers according to claim 1, wherein the silane is selected from the group consisting of (EtO)$_3$Si—CH$_2$CH$_2$CH$_2$—(S$_4$—CH$_2$CH$_2$—O—CH$_2$—O—CH$_2$CH$_2$)$_n$—S$_4$—CH$_2$CH$_2$CH$_2$—Si(OEt)$_3$ with $\bar{n}$=2, (EtO)$_3$Si—CH$_2$CH$_2$CH$_2$—(S$_4$—CH$_2$CH$_2$—O—CH$_2$—O—CH$_2$CH$_2$)$_n$—S$_4$—CH$_2$CH$_2$CH$_2$—Si(OEt)$_3$ with $\bar{n}$=3, (EtO)$_3$Si—CH$_2$CH$_2$CH$_2$—(S$_4$—CH$_2$CH$_2$—O—CH$_2$—O—CH$_2$CH$_2$)$_n$—S$_4$—CH$_2$CH$_2$CH$_2$—Si(OEt)$_3$ with $\bar{n}$=4, (EtO)$_3$Si—CH$_2$CH$_2$CH$_2$—(S$_4$—CH$_2$CH$_2$—O—CH$_2$CH$_2$—O—CH$_2$CH$_2$)$_n$—S$_4$—CH$_2$CH$_2$CH$_2$—Si(OEt)$_3$ with $\bar{n}$=2 and (EtO)$_3$Si—CH$_2$CH$_2$CH$_2$—(S$_4$—CH$_2$CH$_2$—CH$_2$CH$_2$—CH$_2$CH$_2$)$_n$—S$_4$—CH$_2$CH$_2$CH$_2$—Si(OEt)$_3$ with $\bar{n}$=3.

16. Surface-treated oxidic or siliceous fillers according to claim 10, wherein the silane is selected from the group consisting of (EtO)$_3$Si—CH$_2$CH$_2$CH$_2$—(S$_4$—CH$_2$CH$_2$—O—CH$_2$—O—CH$_2$CH$_2$)$_n$—S$_4$—CH$_2$CH$_2$CH$_2$—Si(OEt)$_3$ with $\bar{n}$=2, (EtO)$_3$Si—CH$_2$CH$_2$CH$_2$—(S$_4$—CH$_2$CH$_2$—O—CH$_2$—O—CH$_2$CH$_2$)$_n$—S$_4$—CH$_2$CH$_2$CH$_2$—Si(OEt)$_3$ with $\bar{n}$=3, (EtO)$_3$Si—CH$_2$CH$_2$CH$_2$—(S$_4$—CH$_2$CH$_2$—O—CH$_2$—O—CH$_2$CH$_2$)$_n$—S$_4$—CH$_2$CH$_2$CH$_2$—Si(OEt)$_3$ with $\bar{n}$=4, (EtO)$_3$Si—CH$_2$CH$_2$CH$_2$—(S$_4$—CH$_2$CH$_2$—O—CH$_2$CH$_2$—O—CH$_2$CH$_2$)$_n$—S$_4$—CH$_2$CH$_2$CH$_2$—Si(OEt)$_3$ with $\bar{n}$=2 and (EtO)$_3$Si—CH$_2$CH$_2$CH$_2$—(S$_4$—CH$_2$CH$_2$—CH$_2$CH$_2$—CH$_2$CH$_2$)$_n$—S$_4$—CH$_2$CH$_2$CH$_2$—Si(OEt)$_3$ with $\bar{n}$=3.

* * * * *